US006587876B1

(12) United States Patent
Mahon et al.

(10) Patent No.: US 6,587,876 B1
(45) Date of Patent: Jul. 1, 2003

(54) GROUPING TARGETS OF MANAGEMENT POLICIES

(75) Inventors: Hugh F Mahon, Fort Collins, CO (US); David M Durham, Hillsboro, OR (US); Puqi Tang, Portland, OR (US)

(73) Assignee: Hewlett-Packard Development Company, Houston, TX (US)

( * ) Notice: Subject to any disclaimer, the term of this patent is extended or adjusted under 35 U.S.C. 154(b) by 0 days.

(21) Appl. No.: 09/382,171

(22) Filed: Aug. 24, 1999

(51) Int. Cl.$^7$ .............................................. G06F 15/173
(52) U.S. Cl. ...................... 709/223; 709/104; 709/203; 709/220; 709/221; 709/222; 709/224; 709/225
(58) Field of Search .................. 709/203, 220–225, 709/317, 104

(56) References Cited

U.S. PATENT DOCUMENTS

| | | | |
|---|---|---|---|
| 5,555,346 A | | 9/1996 | Gross et al. |
| 5,797,128 A | * | 8/1998 | Birnbaum ..................... 707/3 |
| 5,812,819 A | | 9/1998 | Rodwin et al. |
| 5,870,561 A | * | 2/1999 | Jarvis et al. ................. 709/238 |
| 5,889,953 A | * | 3/1999 | Thebaut et al. .............. 709/221 |
| 6,014,700 A | * | 1/2000 | Bainbridge et al. .......... 709/104 |
| 6,021,438 A | | 2/2000 | Duvvoori et al. |
| 6,041,347 A | * | 3/2000 | Harsham et al. ............ 709/220 |
| 6,052,723 A | * | 4/2000 | Ginn ........................... 709/223 |
| 6,064,656 A | * | 5/2000 | Angal et al. ................ 370/254 |
| 6,104,700 A | * | 8/2000 | Haddock et al. ............ 370/235 |
| 6,105,027 A | * | 8/2000 | Schneider et al. ............ 707/10 |
| 6,158,010 A | * | 12/2000 | Moriconi et al. ............ 709/223 |
| 6,167,445 A | * | 12/2000 | Gai et al. ................... 709/220 |
| 6,233,686 B1 | | 5/2001 | Zenehelsky et al. |
| 6,237,036 B1 | * | 5/2001 | Ueno et al. ................. 709/225 |
| 6,255,943 B1 | * | 7/2001 | Lewis et al. ................ 340/506 |
| 6,289,394 B1 | * | 9/2001 | Kozuka ...................... 709/317 |

FOREIGN PATENT DOCUMENTS

WO    WO 96/21324    7/1996    ............ H04Q/3/00

OTHER PUBLICATIONS

Internet Draft, Internet Engineering Task Force, An Expedited Forward PHB (Jun. 1999), < http://www.ietf.org/>.
Stardust.com, Inc., Introduction to QoS Policies (Jul. 1999), <http://www.stardust.com/policy/whitepapers/qospol.htm/>.
Internet Draft, Internet Engineering Task Force, An Architecture for Differentiated Services (Dec. 1998), < http://www.ietf.org/>.
Internet Draft, Internet Engineering Task Force, Assured Forwarding PHB Group (Jun. 1999), < http://www.ietf.org/>.
Internet Draft, Internetl Engineering Task Force, A Two–bit Differentiated Services Architecture for The Internet (Jul. 1999), <http://www.ietf.org/>.

* cited by examiner

Primary Examiner—Nabil El-Hady

(57) ABSTRACT

Method and apparatus for assigning policies which are rules that govern the use of or access to network services. Each rule defines conditions that when evaluated true trigger actions to allow or deny the service. Techniques are disclosed which provide for explicit, flexible, and centralized assignment of policy to targets which are specified network services. These techniques include explicitly associating a policy with a network resource or process, grouping policy related processes, grouping related targets, associating groups of targets with groups of policies, mapping a user name contained in a policy to an associated network address such as an Internet Protocol (IP) address, and providing dynamically mapped policy identified user and host names with associated network addresses, such as IP addresses, to client processes.

13 Claims, 11 Drawing Sheets

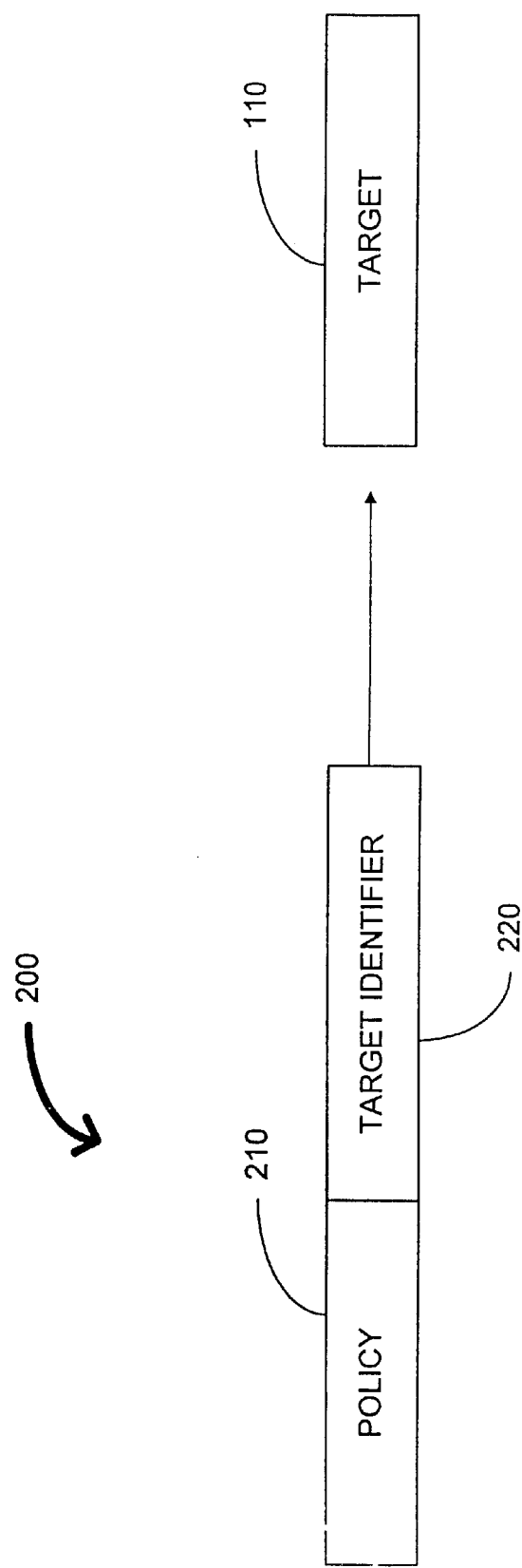

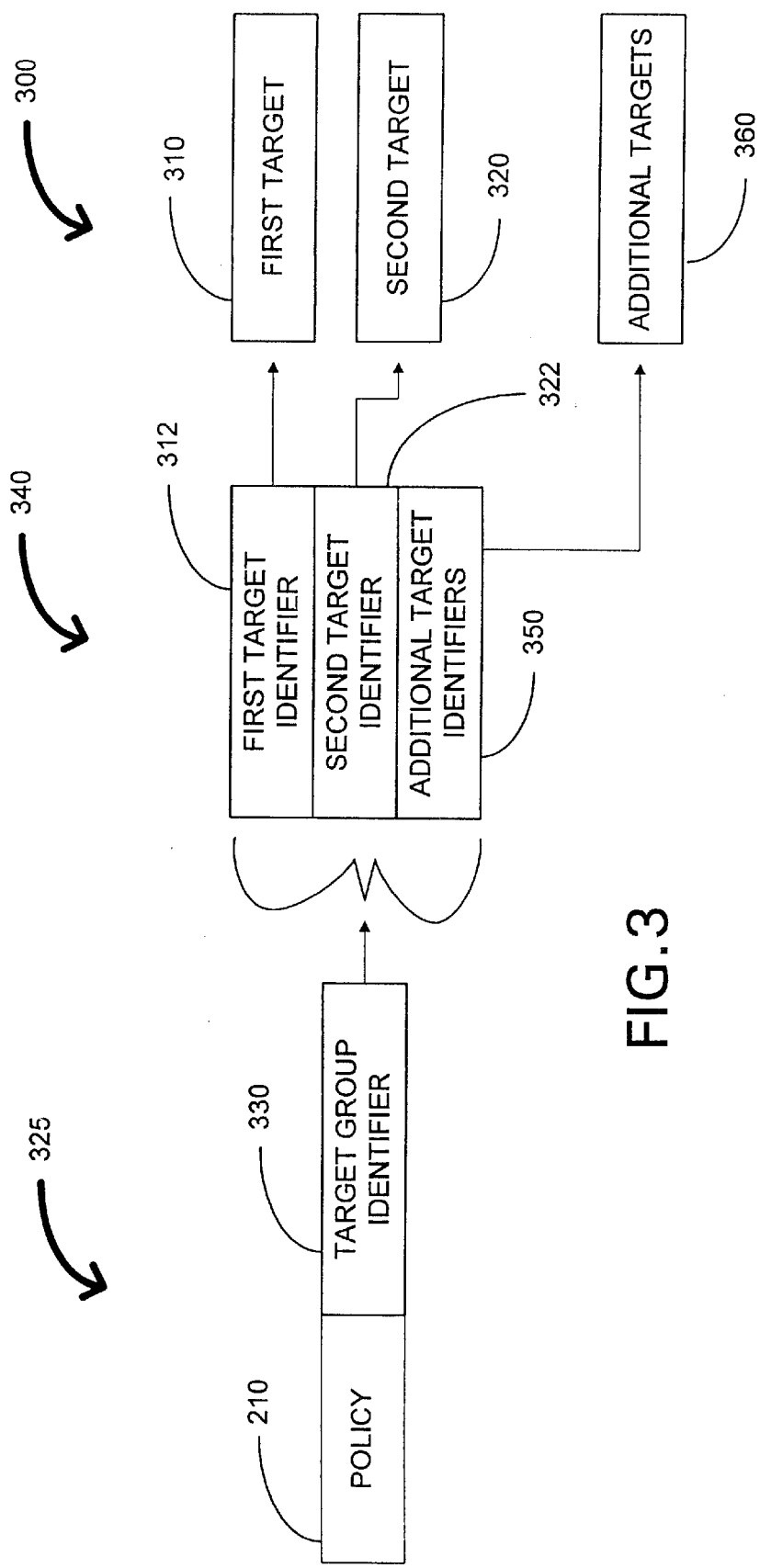

GROUPING TARGETS OF MANAGEMENT POLICIES

FIELD OF THE INVENTION

The present invention relates generally to networks, more particularly, to dynamically assigned Internet Protocol (IP) address networks, and even more particularly to the use of user-based policies in networks.

BACKGROUND OF THE INVENTION

In a network, a policy-based management system maintains policies or rules that govern the use of or access to a network service. As used herein, a policy is a single rule which defines conditions that when evaluated true trigger actions to allow or deny the service. A number of policies can be combined together to form a policy group. However, a recent evolution in terminology of the art (not universally accepted and not followed herein) uses the term "policy" itself to mean the combination of more than one rule, and the term "rule" to mean a single rule.

Previous methods for implementing policies in such systems have relied upon having fixed network addresses. Modern networks, however, more and more depend upon dynamic assignment of addresses for items attached to the network. In computing environments where network addresses are dynamically assigned to computers as they connect into the network, a user's workstation or laptop computer no longer maintains a static network address, and often it does not maintain a hostname that is recognized by the computing environment. This is especially true when dialing into a corporation's network using remote access mechanisms.

Previous solutions have also depended upon assigning policy implicitly based upon characteristics of a device or logical entity which is configured separately from the policy management tools. Such techniques lack flexibility in assignment of policy and lack centralized distribution to the network services being managed. In addition, previous proposed solutions do not resolve conflict between different functions on a manageable entity between policies with different action or condition types applied with a single rule. In fact, to date organizations that define standards for implementing policy have only loosely defined methods for associating policy with a managed entity.

Thus, there is a need for grouping policy related processes and resources, referred to herein as targets.

SUMMARY OF THE INVENTION

As networks have become more and more complicated, so has the management of those networks. The present patent document discloses novel methods and means for using rules that control interactions of entities in electronic systems, such as networks. A collection of such rules are referred to herein as policies. A network comprises processes and resources that provide services to other processes and resources which, in turn, are also connected to the network. In representative embodiments, the present document discloses techniques for grouping policy related processes and resources, referred to herein as targets.

As indicated, electronic systems, such as networks, that comprise resources or processes can control the interactions of such items by means of rules or policies. These items could be for example processes, functions, abstract objects, or physical electronic devices such as computers, printers, etc. Thus, policy refers to the description of a behavior or action that is desired for the item to which the policy applies. In network systems, policies are typically associated with items that affect the flow of data on that network. In order to affect that network traffic flow, policies are directed toward or targeted at managed or controlled entities. An example of a policy could be "assign priority 5 to traffic from the user whose name is user_one".

As referred to herein, a target is a process or resource that is being managed using a policy or policies. The managed item itself may be able to recognize and conform to the policy, or may be managed by a proxy which recognizes policy information and converts it to configuration information that the managed entity can recognize and conform to.

Modern network devices are typically managed as a unit, i.e., the various features of the device are all managed together. For example, a router has multiple interfaces, with each interface representing a connection to one or more networks. The router's function is to route traffic between these networks. Further, each interface can have multiple capabilities, each of which can affect the traffic in different ways. These mechanisms can each be configured separately. But, in modern network devices all of these different aspects of a single device are typically managed together, usually presenting a difficult to understand interface to the administrator of the network. As a result, the management of even a single device can become a daunting task. In representative embodiments, the present patent document discloses techniques by which separate aspects of a given device can be managed individually by policies.

An advantage of the representative embodiments as described in the present patent document is that the grouping of targets allows the administrator to easily view and manage the entities, whether logical or physical, that are involved in the delivery of a service which could be for example a database, access to a system, or some other service, together rather than individually.

The policy creator benefits from a single, consistent resolution mechanism for the policy-managed environment. Developers of client programs are relieved of the burden of providing for the name resolution themselves, they rely on the server program to perform this service. Central mapping also ensures that consistent information is used throughout the managed environment. Policies can now work in a dynamic environment with automated updates of the changing information without further intervention by the administrator, and with minimal effort on the part of the policy enforcement implementor. The server program would interact with the user name to network address mapping program to determine when an address is assigned and then notify the Policy Enforcement clients, the client programs, that a change had occurred, and what the new mapping is.

Other aspects and advantages of the present invention will become apparent from the following detailed description, taken in conjunction with the accompanying drawings, illustrating by way of example the principles of the invention.

BRIEF DESCRIPTION OF THE DRAWINGS

The accompanying drawings provide visual representations which will be used to more fully describe the invention and can be used by those skilled in the art to better understand it and its inherent advantages. In these drawings, like reference numerals identify corresponding elements and:

FIG. 2 is a drawing of a policy-target data structure wherein a policy is explicitly associated with a target as described in various representative embodiments of the present patent document.

FIG. 3 is a drawing of the logical combination of first and second targets to form a target group wherein the policy is explicitly associated with the target group as described in various representative embodiments of the present patent document.

DETAILED DESCRIPTION OF THE PREFERRED EMBODIMENTS

1. Introduction

Figure 1A:
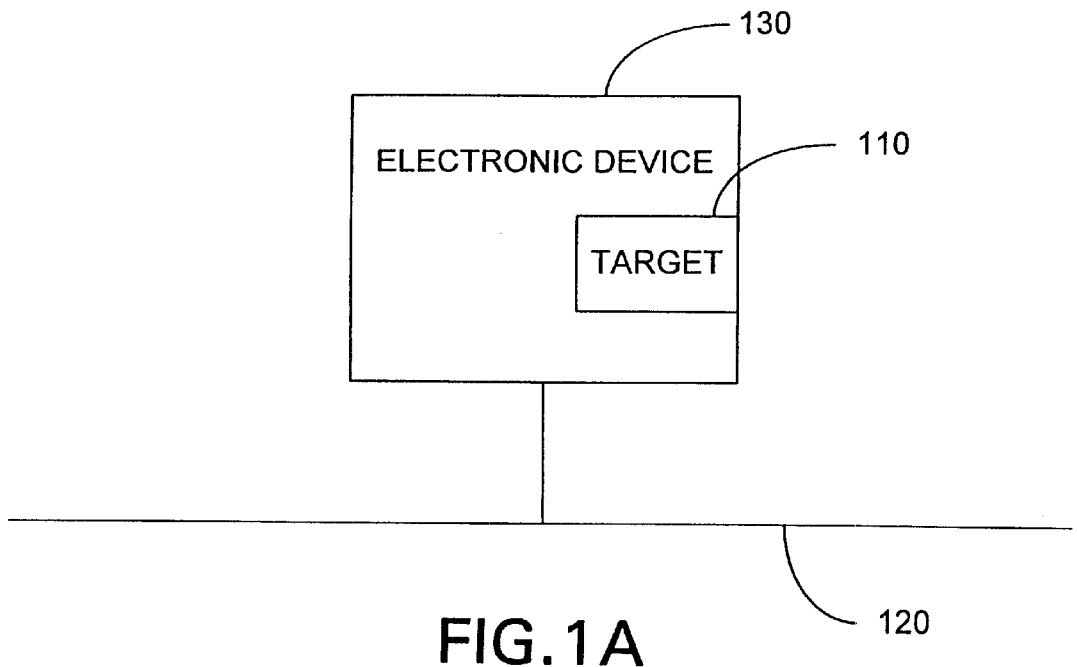
FIG. 1A is a drawing of a target connected to a network as described in various representative embodiments of the present patent document.

As shown in the drawings for purposes of illustration, the present patent document discloses novel methods and means for using rules that control interactions of entities in electronic systems, such as networks. Rules such as these are referred to herein as policies. A network comprises processes and resources that provide services to other processes and resources which, in turn, are also connected to the network. In representative embodiments, the present document discloses techniques for (1) explicitly associating a policy with a network resource or process, (2) grouping policy related processes and resources, referred to herein as targets, (3) associating groups of targets with groups of policies, (4) managing policy by using policy targets, (5) providing a mapping of a host name contained in a policy to an associated network address, such as an Internet Protocol (IP) address, and (6) providing a mapping of a user name contained in a policy to an associated network address, such as an Internet Protocol (IP) address.

In the following detailed description and in the several figures of the drawings, like elements are identified with like reference numerals.

2. Policies

As indicated, electronic systems, such as networks, that comprise resources or processes can control the interactions of such items by means of rules which are referred to herein as policies. These items could be for example processes, functions, abstract objects, or physical electronic devices such as computers, printers, etc. Thus, policy refers to the description of a behavior or action that is desired for the item to which the policy applies. In network systems, policies are typically associated with items that affect the flow of data on that network. In order to affect that network traffic flow, policies are directed toward or targeted at managed or controlled entities. An example of a policy could be "assign priority 5 to traffic from the user whose name is user_one".

3. Targets

As referred to herein, a target is a process or resource that is being managed using a policy or policies. The managed item itself may be able to recognize and conform to the policy, or may be managed by a proxy which recognizes policy information and converts it to configuration information that the managed entity can recognize and conform to.

Modern network devices are typically managed as a unit, i.e., the various features of the device are all managed together. For example, a router has multiple interfaces, with each interface representing a connection to one or more networks. The router's function is to route traffic between these networks. Further, each interface can have multiple capabilities, each of which can affect the traffic in different ways. These mechanisms can each be configured separately. But, in modem network devices all of these different aspects of a single device are typically managed together, usually presenting a difficult to understand interface to the administrator of the network. As a result, the management of even a single device can become a daunting task. In representative embodiments, the present patent document discloses techniques by which separate aspects of a given device can be managed individually by policies.

FIG. 1A is a drawing of a target 110 connected to a network 120 as described in various representative embodiments of the present patent document. In the example of FIG. 1A, the target 110 is a controllable entity of an electronic device 130 which is connected to the network 120. Using the concept of the target 110, a particular capability or rule can be isolated to a single manageable element which has that capability or functions according to the rules of the policy. In this way the administrator can more readily deal with the manner in which network traffic is to be treated at specific points in the network.

In the above example, the router could be the electronic device 130 and could also be the target 110. Alternatively, any of the interfaces of the router could be the target 110. In another example, the target 110 on the router could also be the priority queuing of messages on a specific individual interface, since it is at this point that the network traffic is actually affected.

Figure 1B:
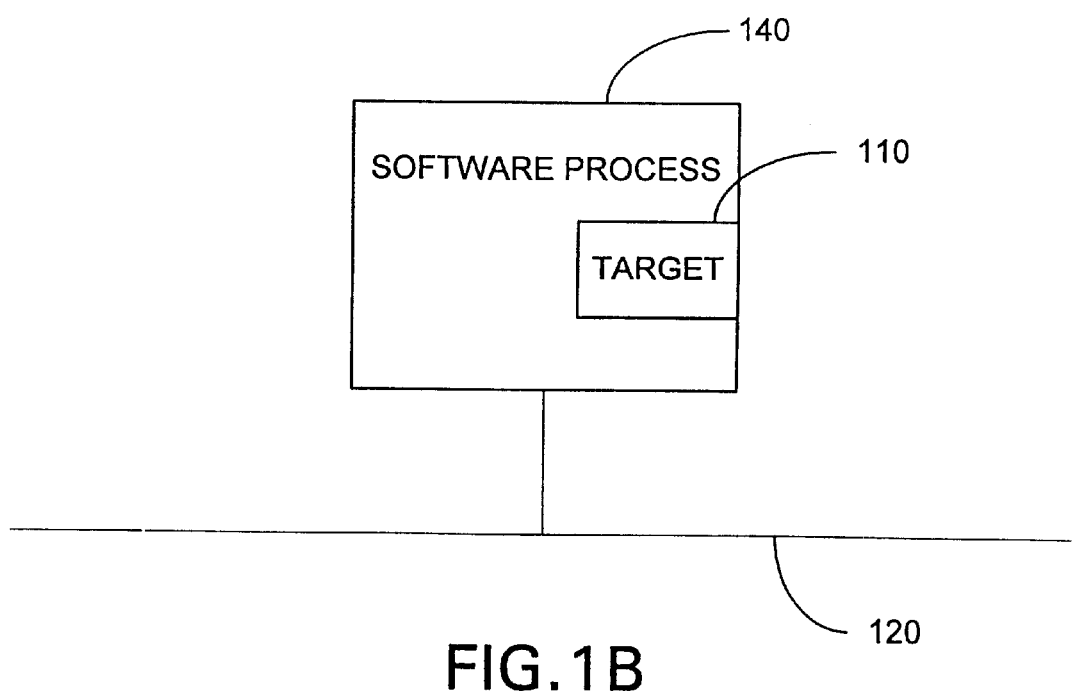
FIG. 1B is a drawing of another target connected to a network as described in various representative embodiments of the present patent document.

FIG. 1B is a drawing of another target 110 connected to the network 120 as described in various representative embodiments of the present patent document. In the example of FIG. 1B, the target 110 is a controllable entity of a software process 140 which is connected to the network 120. Again using the concept of the target 110, a particular capability can be isolated to a single manageable function within the software process 140 which has the specified capability or functions according to the rules of the policy.

Breaking such capabilities into separate conceptual targets 110 of policy, as in the example of the interfaces of the router, enables the same description of behavior to be applied to many different devices which, in a high-level abstraction, provide similar capabilities. In addition, with the appropriate abstractions, devices from different vendors, and indeed different types of devices, e.g., routers, switches, and trafficshapers can be managed with identical policies. Trafficshapers are a class of devices that regulate or shape the flow of network traffic based on a histogram of such traffic.

Thus, the concept of targets 110 can be abstracted down to a discreet function of the smallest manageable item on the single electronic device 130 or system, thereby providing the capability for efficient, simplified, large-scale management of the network 120 with policies.

4. Policy Explicitly Assigned to Target

In order to be managed by a policy, the policy must be assigned to or associated with the entity to be managed. Both logical and physical entities can be managed. Logical entities include software components such as a networking stack within a computing system, a software process or application, a distinct feature of a network interface on a device, or a security enforcement mechanism such as a logon tool. Examples of physical entities are routers and switches.

FIG. 2 is a drawing of a policy-target data structure 200 wherein a policy 210, also referred to herein as a rule 210, is explicitly associated with target 110 as described in various representative embodiments of the present patent document. In a representative embodiment, the policy-target data structure 200, also referred to herein as the data structure 200, comprises the policy 210 and a target identifier 220. Explicit association of policy 210 and target 110 is provided via the target identifier 220, wherein the target identifier 220 identifies the target 110 to which the policy 210 applies. This identification is indicated in FIG. 2 via the line with the arrowhead pointing from the target identifier 220 to the target 110. Such explicit association provides the administrator with explicit control over where the policy 210 is to be assigned, whereas if the target 110 is associated with the policy 210 as a consequence of characteristics or actions separate from the decisions made by the administrator such precise and flexible control would not be provided. Thus, unintentional or undesired deployment of policy 210 to a configured element is avoided. Use of policies 210 can be expensive in terms of resource consumption, so the manager may not wish to have every network element receive policy information, even if all entities are capable of using policy 210. As another example, access to security permissions should be strictly controlled, and thus, the deployment of policies 210 related to security should be explicit, not implicit. A primary advantage of this embodiment is that it provides simplified control of policy 210 deployment as it allows deployment to be defined and to be visible to the policy administrator. Implicit deployment would not allow such simplified control.

5. Grouping of Related Targets

FIG. 3 is a drawing of the logical combination of first and second targets 310,320 to form a target group 300 wherein the policy 210 is explicitly associated with the target group 300 as described in various representative embodiments of the present patent document. The logical combination of additional targets 360 with the first and second targets 310,320 to form the target group 300 is also possible. Also shown in FIG. 3 in a representative embodiment is a policy-target-group data structure 325 comprising the policy 210 and a target group identifier 330. Explicit association of policy 210 and target group 300 is provided via the target group identifier 330, wherein the target group identifier 330 identifies a group-target-identifier data structure 340. The group-target-identifier data structure 340 comprises a first target identifier 312 and a second target identifier 322. In an alternative embodiment, the group-target-identifier data structure 340 further comprises additional target identifiers 350 which identify additional targets 360. The first target identifier 312 identifies the first target 310, the second target identifier 322 identifies the second target 320, and in the alternative embodiment the additional target identifiers 350 identify additional targets 360. This identification is indicated in FIG. 3 via the line with the arrowhead pointing from the target group identifier 330 to the group-target-identifier data structure 340 and the lines with arrowheads pointing from the first and second target identifiers 312,322 to the first and second targets 310,320 respectively. In the alternative embodiment, identification includes the line with the arrowhead pointing from the additional target identifiers 350 to the additional targets 360. In the representative embodiment, targets 310,320 which are related in their role in the managed environment are grouped together for the purpose of policy assignment. In creating target groups 300, the administrator establishes a logical association between targets 310,320. These targets 310,320 may be of different kinds of elements, e.g., router interfaces, network stacks, trafficshapers, etc. Generally, however, the targets 310,320 would all be related in delivering one or more related services.

Grouping targets 310,320 allows the administrator to easily view and manage the entities, whether logical or physical, that are involved in the delivery of a service which could be for example a database, access to a system, or some other service, together rather than individually.

6. Association of Target Groups with Policy Groups

Figure 4:
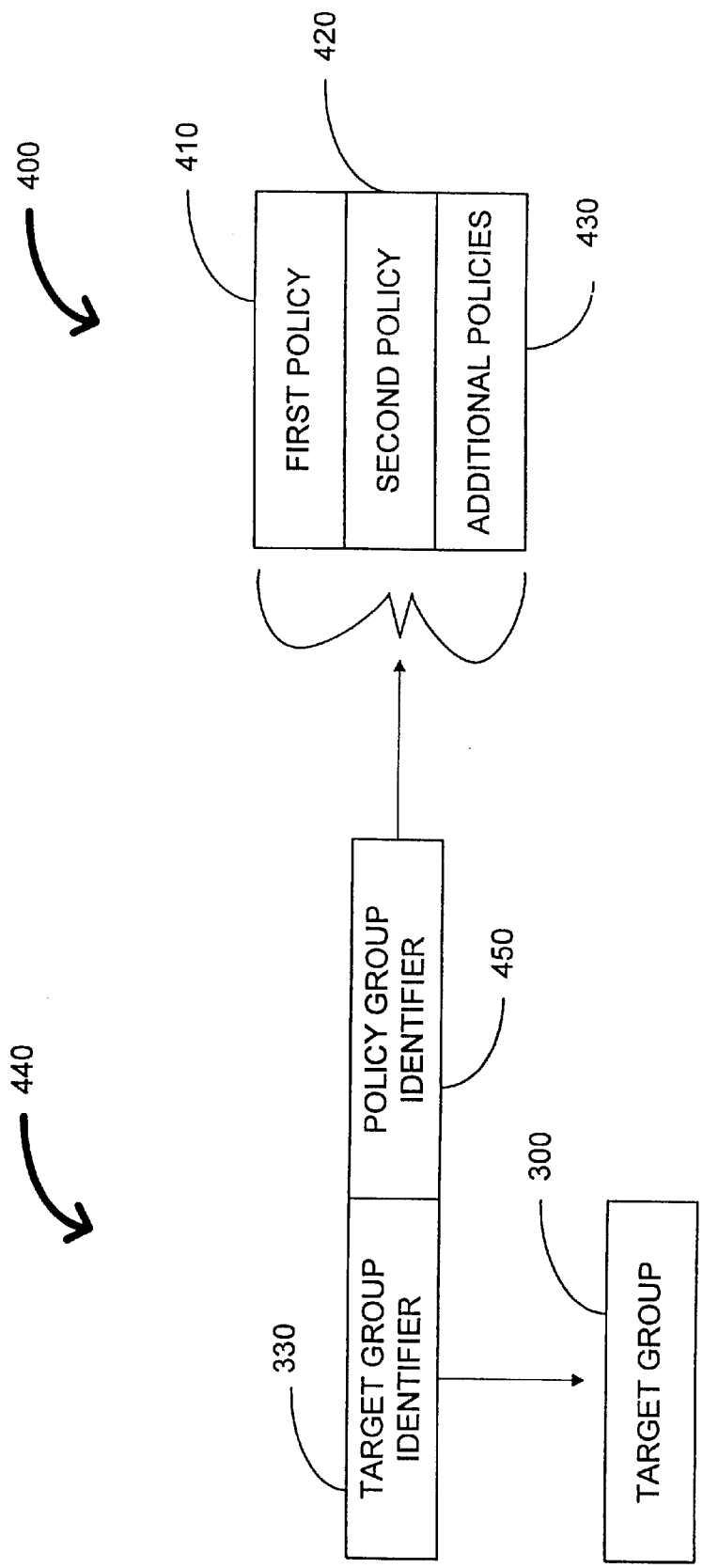
FIG. 4 is a drawing of the logical combination of first and second policies to form a policy group which is explicitly associated with a target group as described in various representative embodiments of the present patent document.

FIG. 4 is a drawing of the logical combination of first and second policies 410,420 to form a policy group 400, wherein the policy group 400 is a group of rules and wherein the policy group 400 is explicitly associated with the target group 300 as described in various representative embodiments of the present patent document. In representative embodiments, the policy group 400 is implemented as the policy-group data structure 400 as shown in FIG. 4. The logical combination of additional policies 430 with the first and second policies 410,420 to form the policy-group data structure 400 is also possible. Also shown in FIG. 4 in a representative embodiment is a target-group/policy-group data structure 440 comprising the target group identifier 330 and a policy group identifier 450. Explicit association of the policy-group data structure 400 with the target group 300 is provided via the target group identifier 330, wherein the target group identifier 330 identifies the target group 300, and the policy group identifier 450, wherein the policy group identifier 450 identifies the policy-group data structure 400. In another alternative embodiment, the policy-group data structure 400 further comprises additional policies 430 which further control the target group 300. Other embodiments replace the target group identifier 330 with the target identifier 220 in the target-group/policy-group data structure 440 and the target group 300 with the target identifier 220. The target group identifier 330 identifies the target group 300 to which the policies 410,420 in the policy-group data structure 400 will be applied. This identification is indicated in FIG. 4 via the line with the arrowhead pointing from the target group identifier 330 to the target group 300. The policy group identifier 450 identifies the policy group 400 which controls the target group 300. This identification is indicated in FIG. 4 via the line with the arrowhead pointing from the policy group identifier 450 to the policy-group data structure 400. In the representative embodiment, first and second policies 410,420 which are related in their role in the managed environment are typically grouped together for the purpose of policy assignment. In creating policy groups 400, the administrator establishes a logical association between policies 410,420. These policies 410,420 are of a single type and may be for different kinds of elements, e.g., router interfaces, network stacks, trafficshapers, etc. Generally, however, the policies 410,420 would all be related in controlling one or more similar services.

Grouping policies 410,420 and associating them with either the target 110 or target group 300 allows the administrator to easily view and manage the entities, whether they are logical or physical, that are involved in the delivery of a service which could be for example a database, access to a system, or some other service, together rather than individually. A primary advantage of the representative embodiment is the reduction of actions required by the policy administrator to achieve the desired behavior for the network.

7. Policy Management Via Policy Targets

Figure 5:
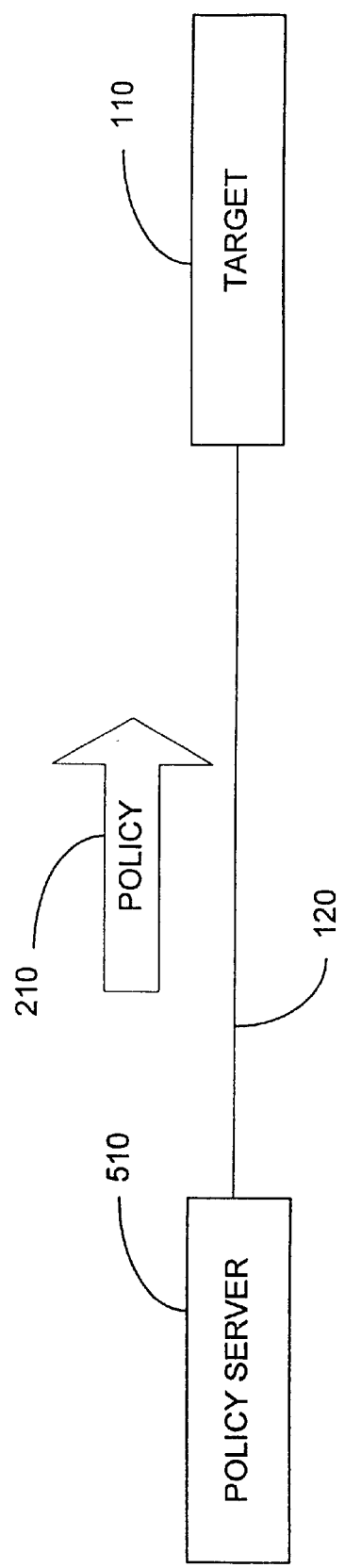
FIG. 5 is a drawing of a policy server providing policy to a target as described in various representative embodiments of the present patent document.

FIG. 5 is a drawing of a policy server 510 providing policy 210 to the target 110 as described in various representative embodiments of the present patent document. In FIG. 5 this transfer is performed via a network 120. The policy server 510 is also referred to herein as the server 510, as the policy server program 510, and as the server program 510.

The chief advantage of managing policy 210 at the target 110 level is that by separating each function of a managed entity complex policies 210 can be developed, which can co-exist on the managed entity, or which enable easy identification of conflicts which may exist between some functions of a managed entity that are mutually exclusive. This mutual exclusivity may manifest itself such that one action type cannot be configured on the managed entity if another action type is also configured. It follows that if the policy rule 210 contains multiple actions within the single rule 210, the entire rule 210 could be invalidated. Other interactions could also be more complex if policy 210 is not managed to the target level 110, since the functionality of the managed entity are harder to determine if not separated out into discrete properties.

In representative embodiments, techniques are disclosed that allow for separating various complex functions of a managed item into separate entities. Policies 210 whose action type matches the function type of the managed entity are associated together. This association not only allows for the ability to simplify conceptually the entities that the policy 210 is applied to, but also provides a logical point to which to associate status attributes regarding the policy 210 which is attached to that point. Without this discrete conceptual point of functionality, which is a subset of the entire functionality of the managed entity, the policy 210 may have multiple actions. It follows that is will be difficult to understand exactly to what the status attribute refers.

Also, breaking such capabilities into separate conceptual targets 110 of policy 210 enables the same description of behavior to be applied to many different devices which, in a high-level abstraction, provide similar capabilities. With the appropriate abstractions, devices from different vendors, and indeed different kinds of devices (e.g., routers, switches, and trafficshapers) can be managed with the same policies; something not possible without the use of targets 110 and the abstraction that policy 210 allows.

8. Policy Management for Host Name Mapped to Dynamically Assigned Network Address Complicating the use of policies is the fact that more and more modem networks depend upon dynamic assignment of addresses for network systems. In representative embodiments, the present patent document discloses techniques that a policy server can use to dynamically map policy containing host names into network addresses, as for example IP addresses. However, the policy does not have to contain the host name per se but can be linked to it.

Figure 6:
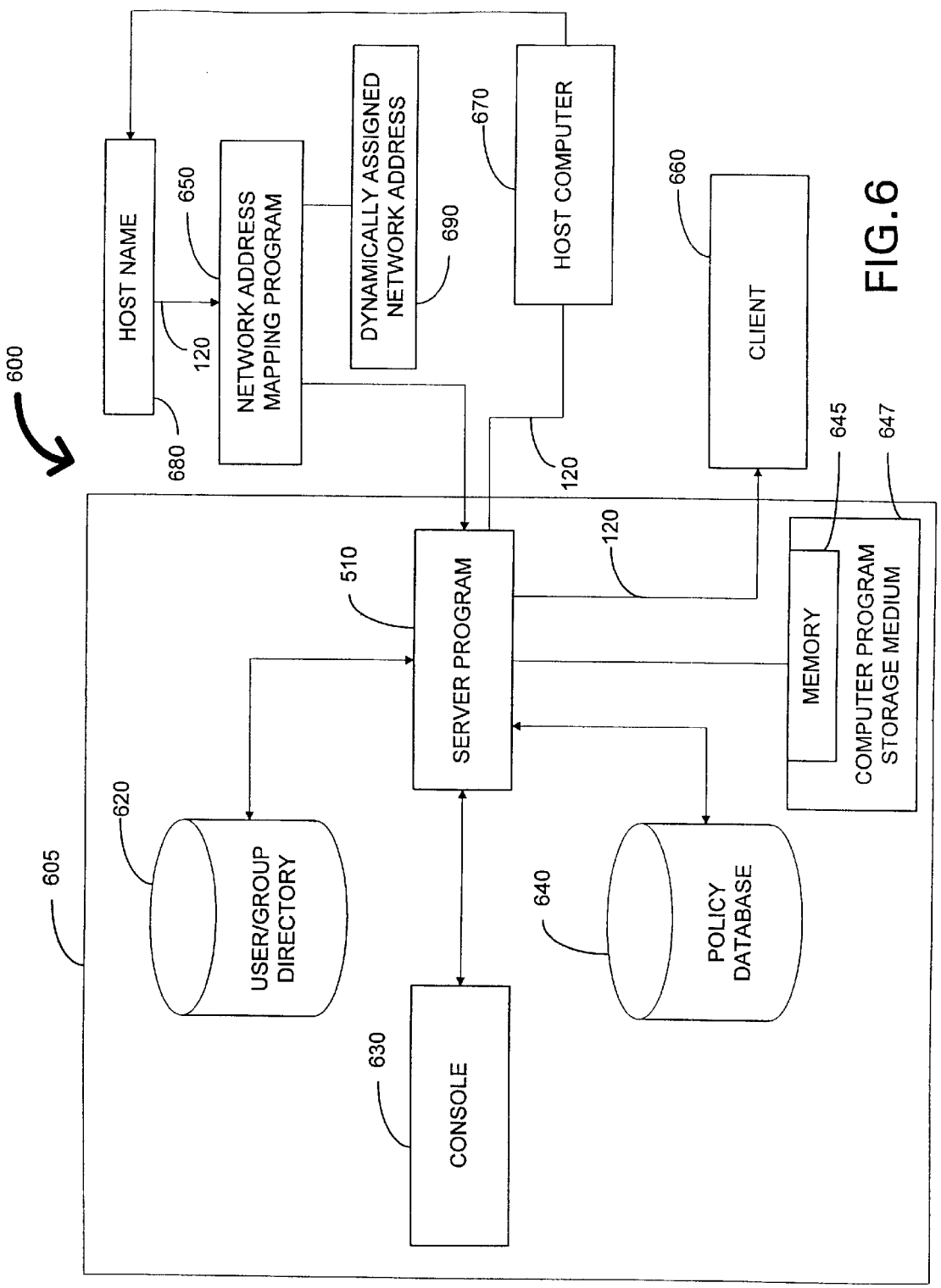
FIG. 6 is a drawing of a system for policy management by a server program for a host computer having dynamic assignment of network address as described in various representative embodiments of the present patent document.

FIG. 6 is a drawing of a system 600 for policy 210 management by the server program 510 for a host computer 670 having dynamic assignment of network address as described in various representative embodiments of the present patent document. In a preferred embodiment, the system 600 is computer system 600. A console 630 connected to the server program 510 provides the user interface to enable the construction of policies 210 or groups of policies 210 stored for example in policy-group data structures 400 and to link them with the appropriate targets 110 or target groups 300. The policies 210 or policy-group data structures 400 are stored in a policy database 640 connected to the server program 510. A repository of mappings between user identities and network addresses, as for example IP addresses, is maintained by a user name to network address management solution in the computing environment, referred to herein as a network address mapping program 650. If users are associated with each other in groups, the assignment of a user to a particular user group is maintained within a user/group directory 620 which is connected to the server program 510.

In a representative embodiment, the functions of the server program 510 are stored in a memory 645 which could be for example located on a computer program storage medium 647 which could also be located on a computer 605. The server program 510 operates on the computer 605 with the user/group directory 620, the console 630, the policy database 640, the memory 645, and the computer program storage medium 647 being a part of the computer 605. In other embodiments, one or more of the user/group directory 620, the console 630, the policy database 640, the memory 645, and the computer program storage medium 647 are separately located from the computer 605.

In a representative embodiment, the host computer 670 attached to the network 120 provides a host name 680, which is unique to and identifies the host computer 670, to the network address mapping program 650. The network address mapping program 650 maps the host name 680 to a dynamically assigned network address 690 which was dynamically assigned to the host computer 670. Note that the dynamically assigned network address 690 changes from time to time, specifically whenever the host computer 670 logs onto the network. Whereas, the host name 680 is essentially static.

When the host computer 670 logs onto the network 120, the server program 510 queries the network address mapping program 650 for the dynamically assigned network address 690 corresponding to the host name 680. The network address mapping program 650 then returns the dynamically assigned network address 690 to the server program. In another embodiment, the network address mapping program 650 supplies the dynamically assigned network address 690 and the host name 680 to the server program 510 whenever the assignment of the dynamically assigned network address 690 is made.

The server program 510 obtains policies 210 from the policy database 640 wherein the policies 210 are associated with the host computer 670 and a client 660, also referred to herein as a client program 660. The server program 510 then transmits the dynamically assigned network address 690 and the target 110 associated policies 210, which as previously indicated are also referred to as rules 210, to the client 660 that is managed by policies 210. By having the server program 510 provide this information, each client 660 need only accept information from the server program 510. Otherwise each client 660 must implement the capabilities to access this mapping information from multiple sources, each of which would provide their own user name to the network address mapping program 650. Such a system would require increased resources for each active client 660 and would take additional system and network resources to resolve the same mappings potentially multiple times. Central mapping also ensures that consistent information is used throughout the managed environment. With central mapping, policies 210 can work in a dynamic environment with automated updates of the changing information without further intervention by the administrator, and reduces the cost of implementing policy 210 in the client 660. Should the server program 510 receive notification from the network address mapping program 650 that host-to-address mappings have changed, the server program 510 re-maps the host name 680 to the network address 690 and re-transmits the policy 210 with updated network address 690 to the client 660.

In a representative embodiment, if the server program 510 is notified that the host computer 670 having the dynamically assigned network address 690 has been deactivated, the server program 510 transmits to the client 660 policy no longer referencing the now invalid dynamically assigned network address 690.

Figure 7:
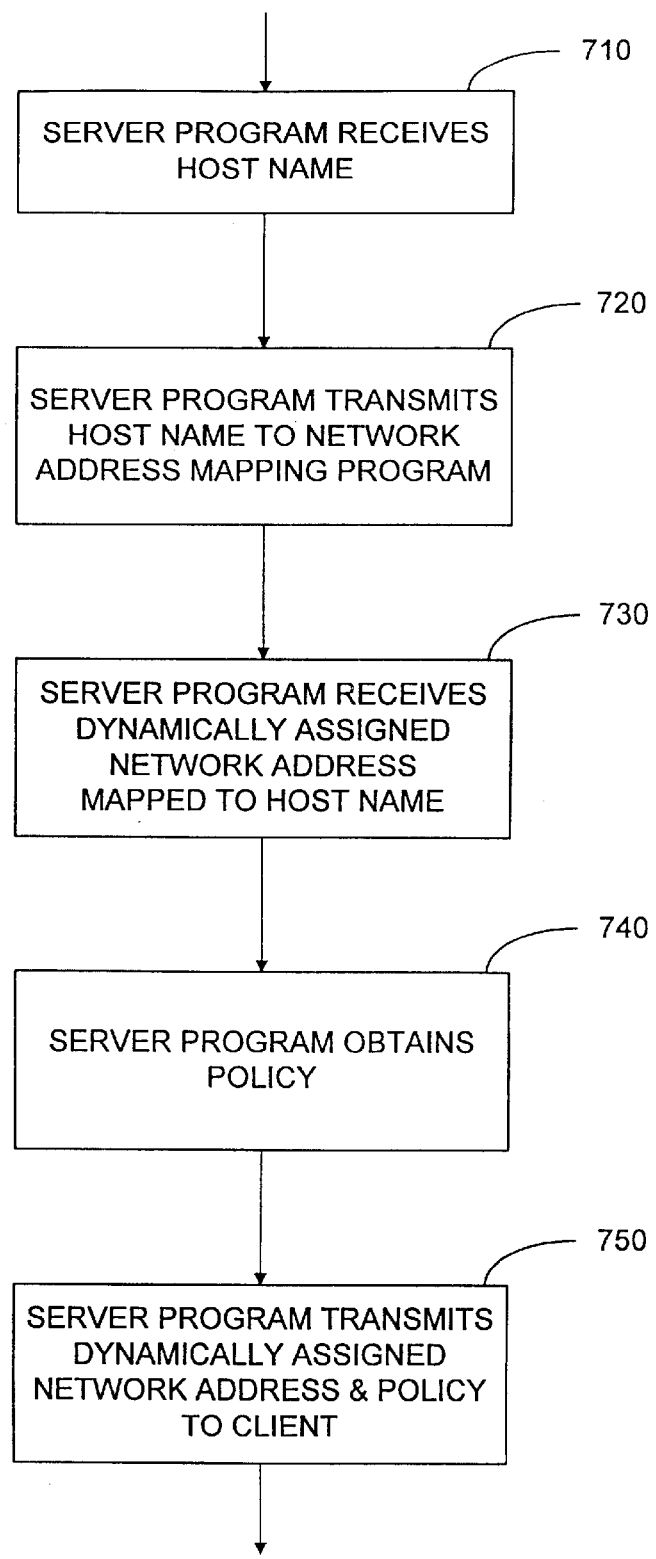
FIG. 7 is a flow chart of a method for activation of policy by a server program for a host computer having dynamically assigned network address as described in various representative embodiments of the present patent document.

FIG. 7 is a flow chart of a method for activation of policy 210 by the server program 510 for the host computer 670 having dynamically assigned network address 690 as described in various representative embodiments of the present patent document. The method of FIG. 7 could be implemented as a computer program.

In block 710 the server program 510 receives the host name 680 for the host computer 670. Block 710 transfers control to block 720.

In block 720 the server program 510 transmits the host name 680 to the network address mapping program 650. Block 720 transfers control to block 730.

In block 730 the server program 510 receives the dynamically assigned network address 690 for the host computer 670 from the network address mapping program 650. Block 730 transfers control to block 740.

In block 740 the server program 510 obtains the policy 210, typically from the policy database 640. Block 740 transfers control to block 750.

In block 750 the server program 510 transmits the dynamically assigned network address 690 for the host computer 670 and the policy 210 to the client 660. Block 750 terminates the method.

Figure 8:
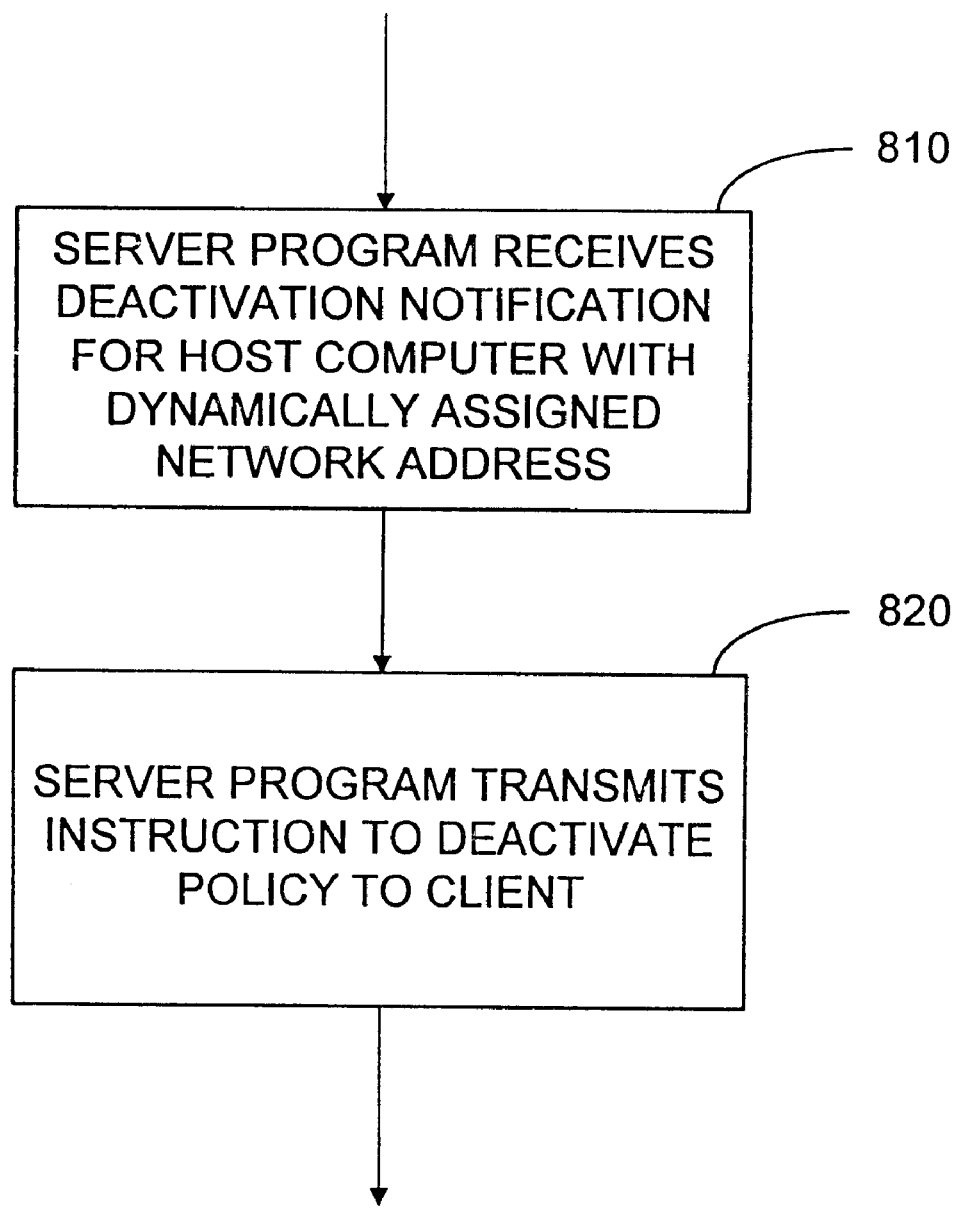
FIG. 8 is a flow chart of a method for deactivation of policy by a server program for a host computer having dynamically assigned network address as described in various representative embodiments of the present patent document.

FIG. 8 is a flow chart of a method for deactivation of policy 210 by the server program 510 for the host computer 670 having dynamically assigned network address 690 as described in various representative embodiments of the present patent document. The method of FIG. 8 could be implemented as a computer program.

In block 810 the server program 510 receives notification of deactivation of host computer 670 with dynamically assigned network address 690. Block 810 transfers control to block 820.

In block 820 the server program 510 transmits instruction to the client 660 to deactivate the policy 210. In a representative embodiment, this instruction comprises the policy 210 without the now invalid dynamically assigned network address 690. Block 820 terminates the method.

In modern network systems, numerous clients 660 and numerous host computers 670 could be active on the network 120 and receiving policies 210 from the server program 510 at any given time.

9. Policy Management for User Name Mapped to Dynamically Assigned Network Address Once again complicating the use of policies is the fact that more and more modern networks depend upon dynamic assignment of addresses for network users and resources. In representative embodiments, the present patent document discloses techniques that a policy server can use to dynamically map policy containing user identities into network addresses, as for example IP addresses. However, the policy does not have to contain the user name per se but can be linked to it.

Figure 9:
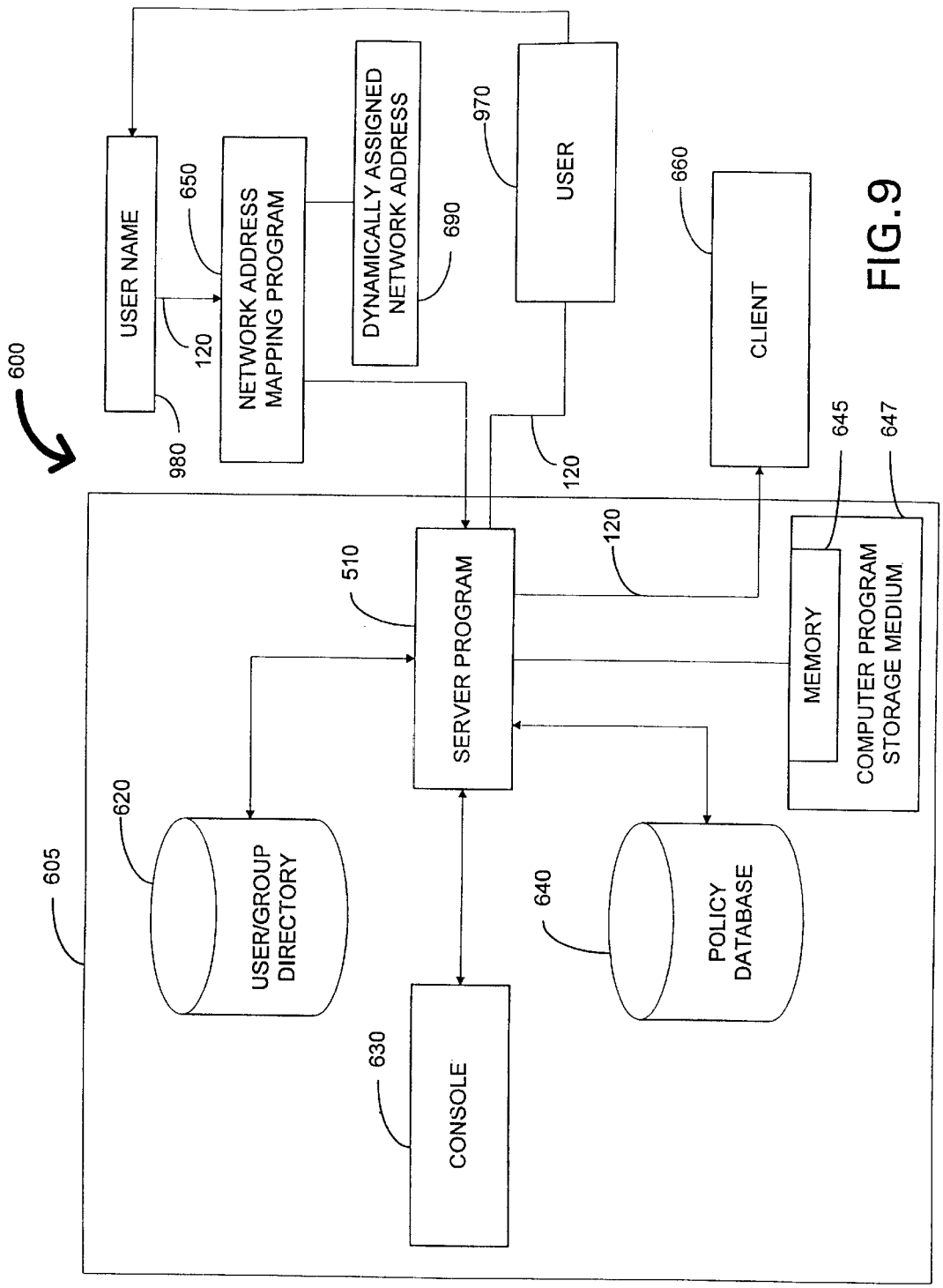
FIG. 9 is a drawing of the system for policy management by the server program for a user having dynamic assignment of network address as described in various representative embodiments of the present patent document.

FIG. 9 is a drawing of the system 600 for policy 210 management by the server program 510 for a user 970 having dynamic assignment of network address as described in various representative embodiments of the present patent document. In a preferred embodiment, the system 600 is computer system 600. The console 630 connected to the server program 510 provides the user interface to enable the construction of policies 210 or groups of policies 210 stored for example in policy-group data structures 400 and to link them with the appropriate targets 110 or target groups 300. The policies 210 or policy-group data structures 400 are stored in the policy database 640 connected to the server program 510. A repository of mappings between user identities and network addresses, as for example IP addresses, is maintained by a user name to network address management solution in the computing environment, referred to herein as the network address mapping program 650. If users are associated with each other in groups, the assignment of a user to a particular user group is maintained within the user/group directory 620 which is connected to the server program 510.

In a representative embodiment, the functions of the server program 510 are stored in the memory 645 which could be for example located on the computer program storage medium 647 which could also be located on the computer 605. The server program 510 operates on the computer 605 with the user/group directory 620, the console 630, the policy database 640, the memory 645, and the computer program storage medium 647 being a part of the computer 605. In other embodiments, one or more of the user/group directory 620, the console 630, the policy database 640, the memory 645, and the computer program storage medium 647 are separately located from the computer 605.

In a representative embodiment, the user 970 attached to the network 120 provides a user name 980, which is unique to and identifies the user 970, to the network address mapping program 650. The network address mapping program 650 maps the user name 980 to the dynamically assigned network address 690 which was dynamically assigned to the user 970. Note that the dynamically assigned network address 690 changes from time to time, specifically whenever the user 970 logs onto the network or connects a computer to the network 120. Whereas, the user name 980 is essentially static.

When the user 970 logs onto the network 120, the server program 510 queries the network address mapping program 650 for the dynamically assigned network address 690 corresponding to the user name 980. The network address mapping program 650 then returns the dynamically assigned network address 690 to the server program. In another embodiment, the network address mapping program 650 supplies the dynamically assigned network address 690 and the user name 980 to the server program 510 whenever the assignment of the dynamically assigned network address 690 is made.

The server program 510 obtains policies 210 from the policy database 640 wherein the policies 210 are associated with the user 970 and the client 660. The server program 510 then transmits the dynamically assigned network address 690 and the target 110 associated policies 210, which as previously indicated are also referred to as rules 210, to the client 660 that is managed by policies 210. By having the server program 510 provide this information, each client 660 need only accept information from the server program 510. Otherwise each client 660 must implement the capabilities to access this mapping information from multiple sources, each of which would provide their own user name to the network address mapping program 650. Such a system would require increased resources for each active client 660 and would take additional system and network resources to resolve the same mappings potentially multiple times. Central mapping also ensures that consistent information is used throughout the managed environment. With central mapping, policies 210 can work in a dynamic environment with automated updates of the changing information without further intervention by the administrator, and reduces the cost of implementing policy 210 in the client 660. Should the server program 510 receive notification from the network address mapping program 650 that host-to-address mappings have changed, the server program 510 re-maps the user name 980 to the network address 690 and re-transmits the policy 210 with modified network address 690 to the client 660.

In a representative embodiment, if the server program 510 is notified that the user 970 having the dynamically assigned network address 690 has been deactivated, the server program 510 transmits to the client 660 the policy 210 without the now invalid network address.

Figure 10:
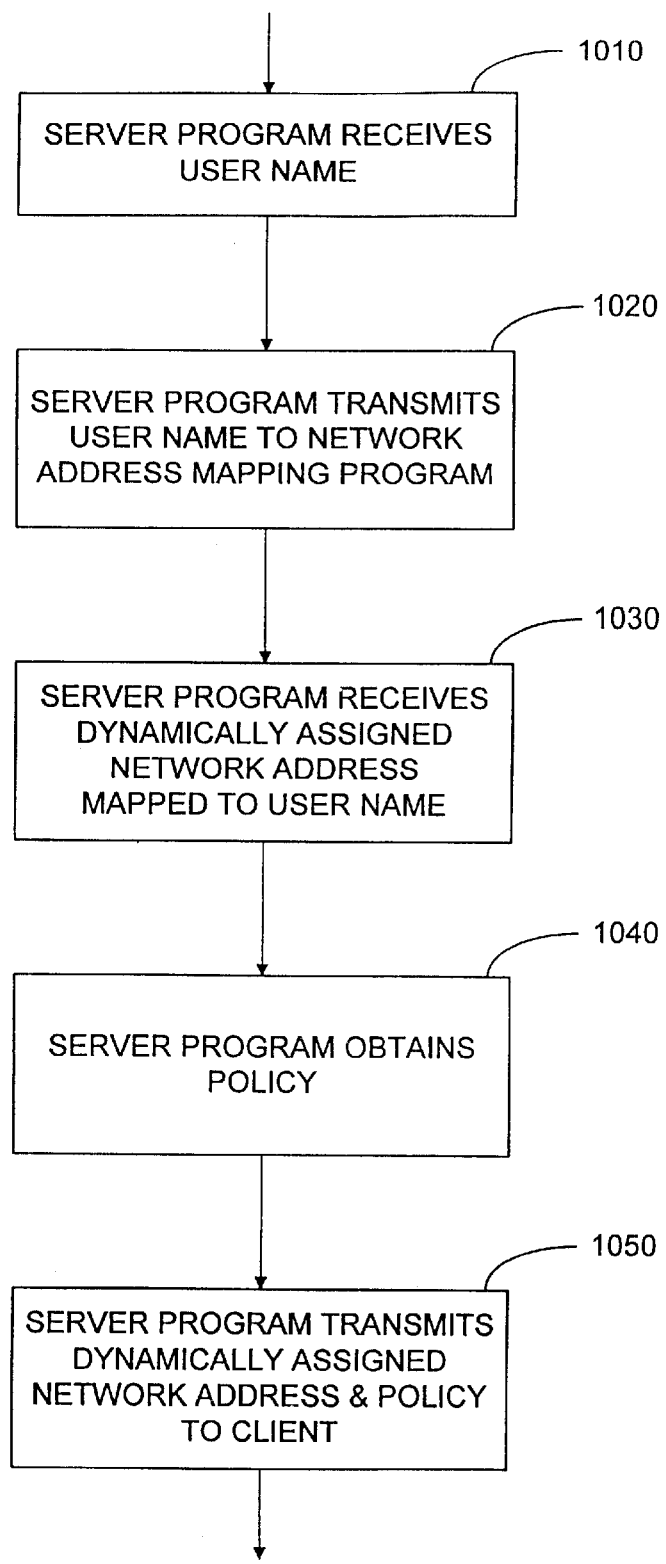
FIG. 10 is a flow chart of a method for activation of policy by the server program for the user having dynamically assigned network address as described in various representative embodiments of the present patent document.

FIG. 10 is a flow chart of a method for activation of policy 210 by the server program 510 for the user 970 having dynamically assigned network address 690 as described in various representative embodiments of the present patent document. The method of FIG. 10 could be implemented as a computer program.

In block 1010 the server program 510 receives the user name 980 for the user 970. Block 1010 transfers control to block 1020.

In block 1020 the server program 510 transmits the user name 980 to the network address mapping program 650. Block 1020 transfers control to block 1030.

In block 1030 the server program 510 receives the dynamically assigned network address 690 for the user 970 from the network address mapping program 650. Block 1030 transfers control to block 1040.

In block 1040 the server program 510 obtains the policy 210, typically from the policy database 640. Block 1040 transfers control to block 1050.

In block 1050 the server program 510 transmits the dynamically assigned network address 690 for the user 970 and the policy 210 to the client 660. Block 1050 terminates the method.

Figure 11:
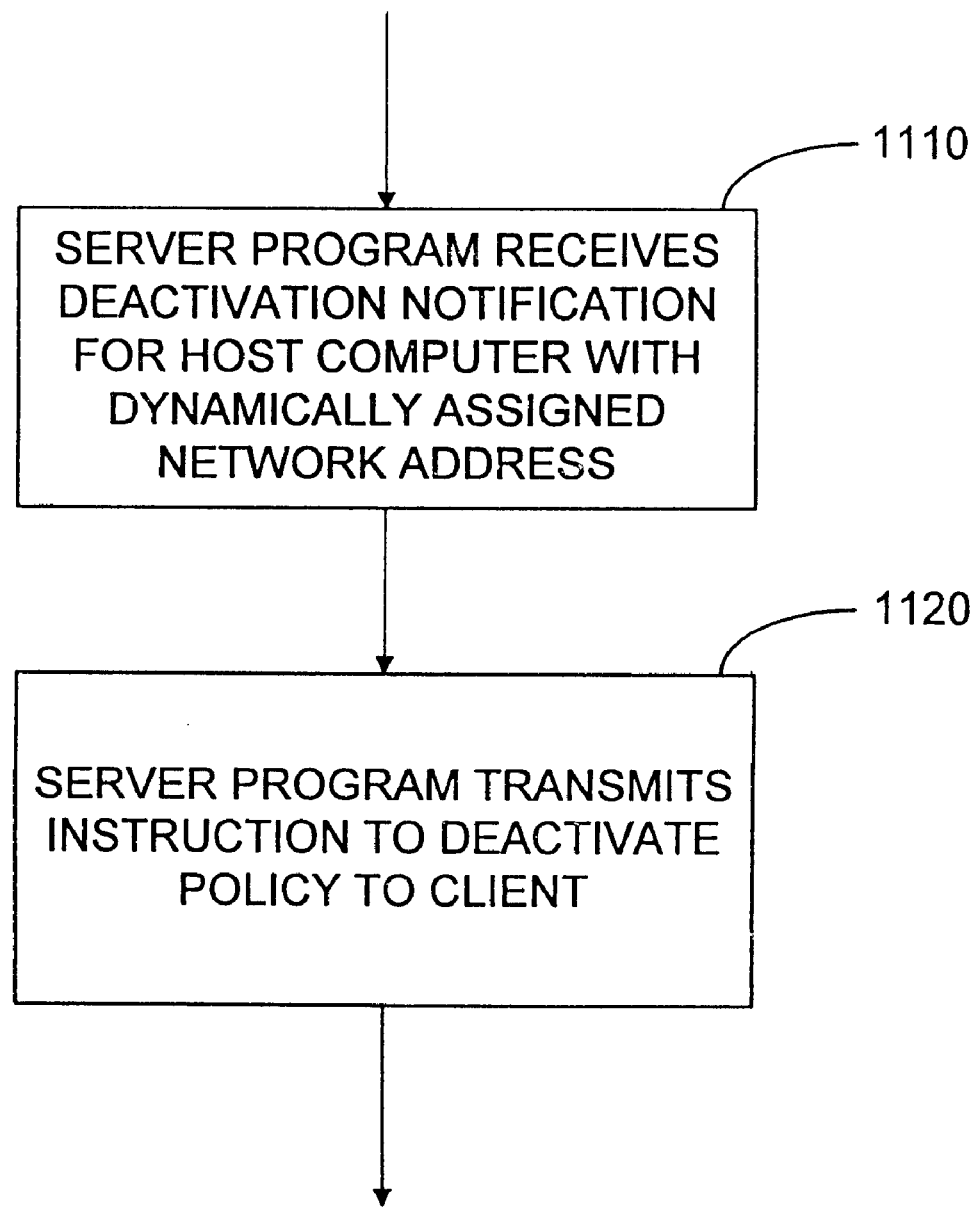
FIG. 11 is a flow chart of a method for deactivation of policy by the server program for the user having dynamically assigned network address as described in various representative embodiments of the present patent document.

FIG. 11 is a flow chart of a method for deactivation of policy 210 by the server program 510 for the user 970 having dynamically assigned network address 690 as described in various representative embodiments of the present patent document. The method of FIG. 11 could be implemented as a computer program.

In block 1110 the server program 510 receives notification of deactivation of user 970 with dynamically assigned network address 690. Block 1110 transfers control to block 1120.

In block 1120 the server program 510 transmits instruction to the client 660 to deactivate the policy 210. In a representative embodiment, this instruction comprises the policy 210 without the now invalid dynamically assigned network address 690. Block 1120 terminates the method.

In modern network systems, numerous clients 660 and numerous users 970 could be active on the network 120 and receiving policies 210 from the server program 510 at any given time.

10. Concluding Remarks

Advantages of the representative embodiments as described in the present patent document are as follows: (1) explicit association of the target 110 with its policy 210 provides for simplified control of policy deployment as it allows deployment to be defined and to be visible to the policy administrator, (2) grouping targets 310,320 allows the administrator to easily view and manage the entities, whether logical or physical, that are involved in the delivery of a service which could be for example a database, access to a system, or some other service, together rather than individually, (3) associating groups of targets 110 with groups of policies 210 also allows the administrator to easily view and manage the entities, whether logical or physical, that are involved in the delivery of a service which could be for example a database, access to a system, or some other service, together rather than individually, assuring consistent behavior as a result of receiving the same policy 210, (4) managing policy 210 using policy targets 110 permits precise assignment of the policy 210, (5) dynamic mapping of user and host names linked to policies 210 provides support for user/group and host names to be used within policy rules knowing that the system can resolve these into current network address assignments without additional work by the policy creator, and (6) by having the server program 510 provide this information, each client 660 need only accept information from the server program 510. The policy creator benefits from a single, consistent resolution mechanism for the policy-managed environment. Developers of clients 660 are relieved of the burden of providing for the name resolution themselves, they rely on the server program 510 to perform this service. Central mapping also ensures that consistent information is used throughout the managed environment. Policies 210 can now work in a dynamic environment with automated updates of the changing information without further intervention by the administrator, and with reduced cost to implement and administer policy 210 in the client 660. The server program 510 would interact with the user name to network address mapping program 650 to determine when an address is assigned and then notify the Policy Enforcement clients, the clients 660, that a change had occurred, and what the new mapping is.

While the present invention has been described in detail in relation to preferred embodiments thereof, the described embodiments have been presented by way of example and not by way of limitation. It will be understood by those skilled in the art that various changes may be made in the form and details of the described embodiments resulting in equivalent embodiments that remain within the scope of the appended claims.

What is claimed is:

1. A computer readable memory device encoded with a policy group/target group data structure, which associates policy groups with target groups, the data structure comprises:

a policy group identifier, wherein the policy group identifier identifies a group-policy-identifier data structure;

a target group identifier, wherein the target group identifier identifies a group-target-identifier data structure;

wherein the group-target-identifier data structure having entries, each entry comprising:
  a first target identifier identifying a first target, and
  a second target identifier identifying a second target; and the group-policy-identifier data structure having entries, each entry comprising:
  a first policy identifier identifying a first policy, and
  a second policy identifier identifying a second policy;

wherein a policy controls conditional actions of first and second targets, wherein the targets are computer system resources, and wherein a client program configures the first and second targets such that the first and second targets conform to the policy received from a server program.

2. The computer readable memory device as recited in claim 1, wherein the client program runs on the target.

3. The computer readable memory device as recited in claim 1, wherein the client program runs external to the target.

4. The computer readable memory device as recited in claim 1, wherein the target is attached to a network.

5. The computer readable memory device as recited in claim 1, wherein the target is a software process.

6. The computer readable memory device as recited in claim 5, wherein the software process runs on a network.

7. The computer readable memory device as recited in claim 1, wherein the target is an interface of an electronic device.

8. The computer readable memory device as recited in claim 7, wherein the electronic device is attached to a network.

9. A computer program storage medium readable by a computer, embodying a computer program of instructions executable by the computer to perform method steps, the method steps comprising:

identifying at least two targets as belonging to a group of targets, wherein the targets are computer system resources, wherein the targets and the computers are connectable to a computer network;

obtaining at least one policy common to each target in the group, wherein the policy specifies a conditional action implementable by the targets in the group and wherein the targets in the group can be configured such that action by the targets conform to the policy;

identifying at least one policy as belonging to a group of policies;

storing a target group identifier, wherein the target group identifier specifies the target group to which the targets belong, a policy group identifier, wherein the policy group identifier specifies the group of policies to which the policies belong, identifiers which specify the policies, and identifiers which specify the targets; and transmitting identified policies to client programs via the network.

10. The computer readable storage medium as recited in claim 9, wherein at least one of the client programs runs on one of the targets.

11. The computer readable storage medium as recited in claim 9, wherein at least one of the client programs runs external to one of the targets.

12. The computer readable storage medium as recited in claim 9, wherein at least one of the targets is a software process.

13. The computer readable storage medium as recited in claim 9, wherein at least one of the targets is an interface of an electronic device.

* * * * *